(12) United States Patent
Amitay et al.

(10) Patent No.: US 9,282,253 B2
(45) Date of Patent: Mar. 8, 2016

(54) SYSTEM AND METHOD FOR MULTIPLE-FRAME BASED SUPER RESOLUTION INTERPOLATION FOR DIGITAL CAMERAS

(71) Applicant: QUALCOMM TECHNOLOGIES, INC., San Diego, CA (US)

(72) Inventors: Amichay Amitay, Hod-Hasharon (IL); Noam Levy, Karmiel (IL)

(73) Assignee: QUALCOMM Technologies, Inc., San Diego, CA (US)

( * ) Notice: Subject to any disclaimer, the term of this patent is extended or adjusted under 35 U.S.C. 154(b) by 123 days.

(21) Appl. No.: 14/183,082

(22) Filed: Feb. 18, 2014

(65) Prior Publication Data

US 2015/0237264 A1    Aug. 20, 2015

(51) Int. Cl.
*H04N 5/232* (2006.01)
*H04N 1/393* (2006.01)
*H04N 5/349* (2011.01)
*G06T 3/40* (2006.01)
*G06T 7/20* (2006.01)

(52) U.S. Cl.
CPC .......... *H04N 5/23296* (2013.01); *G06T 3/4053* (2013.01); *H04N 1/3935* (2013.01); *H04N 5/23232* (2013.01); *H04N 5/349* (2013.01)

(58) Field of Classification Search
CPC . H04N 5/23296; H04N 1/3935; H04N 5/349; H04N 5/23232; G06T 3/4053; G06T 7/20
USPC ................. 348/240.2; 382/254, 300
See application file for complete search history.

(56) References Cited

U.S. PATENT DOCUMENTS

| 7,983,503 | B2 | 7/2011 | Vakrat et al. |
| 2004/0086193 | A1* | 5/2004 | Kameyama ........... G06T 3/4053 382/300 |
| 2011/0242371 | A1 | 10/2011 | Vakrat et al. |

(Continued)

FOREIGN PATENT DOCUMENTS

EP        2141916 A2      1/2010

OTHER PUBLICATIONS

Adams J.E., et al., "Digital Camera Image Processing Chain Design" in *Single-Sensor Imaging: Methods and Applications for Digital Cameras*, CRC Press, Sep. 9, 2008, XP055158003, ISBN: 978-1-42-005452-1, pp. 67-103.

(Continued)

*Primary Examiner* — Nhan T Tran
(74) *Attorney, Agent, or Firm* — Knobbe Martens Olson & Bear, LLP

(57) ABSTRACT

A digital camera system for super resolution image processing constructed to receive a plurality of input frames and output at least one digitally zoomed frame is provided. The digital camera system includes a motion registration module configured to generate motion information associated with the plurality of input frames, an interpolation module configured to generate a plurality of interpolated input frames based at least in part on the plurality of input frames and the motion information, a weights calculation module configured to calculate one or more weights associated with the plurality of input frames based on at least the motion information, and a weighted merging module configured to merge the plurality interpolated input frames consistent with the one or more weights to generate the at least one digitally zoomed frame.

18 Claims, 4 Drawing Sheets

(56) References Cited

U.S. PATENT DOCUMENTS

| | | | |
|---|---|---|---|
| 2012/0092525 A1* | 4/2012 | Kusaka | H04N 5/2628 348/231.99 |
| 2013/0114892 A1* | 5/2013 | Vandame | G06T 3/4053 382/162 |
| 2013/0114894 A1* | 5/2013 | Yadav | G06K 9/40 382/167 |
| 2014/0072232 A1* | 3/2014 | Zheng | G06T 3/4053 382/199 |
| 2014/0368682 A1 | 12/2014 | Wu | |

OTHER PUBLICATIONS

Battiato, S., et al., "Smart Interpolation by Anisotropic Diffusion." 12th International Conference on Image Analysis and Processing (ICIAP'03) (2003): 572; 6 pages.

Gunturk B.K, "Multi-Frame Information Fusion for Image and Video Enhancement", Identification of Susceptibility Genes for Bipolar Affective Disorder and Schizophrenia on Chromosome 22Q13: Ph.D. Thesis, Faculty of Health Sciences, University of Aarhus, DK, Aug. 1, 2003, XP007900807, 130 Pages.

International Search Report and Written Opinion—PCT/US2015/015580—ISA/EPO—Jun. 2, 2015.

Patil V.H., et al., "Interpolation for Super Resolution Imaging" in Innovations and Advanced Techniques in Computer and Information Sciences and Engineering; T. Sobh [Ed], University of Bridgeport, Jan. 1, 2007, XP008120401, pp. 483-489.

VanDame B., "Fast and efficient resampling for multi-frame super-resolution", 2013 Proceedings of the 21st European Signal Processing Conference (EUSIPCO),IEEE Sep. 9, 2013, XP032593642, pp. 1-5.

Milanfar, Peyman, "Super-Resolution Imaging—Digital Imaging and Computer Vision," CRC Press, pp. 3-34, Sep. 2010.

U.S. Appl. No. 13/921,712, titled "System and Method for Single-Frame Based Super Resolution Interpolation for Digital Cameras," filed Jun. 19, 2013, 27 pages.

i 001 ; Vandewalle P., et al., "A Frequency Domain Approach to Registration of Aliased Images . ; with Application to Super-resolution", Eurasip Journal on Advances in Signal Processing, vol. 2, No. 6, 1 Jan. 2006 (2006-01-01), pp. 1 — 14, XP055240640.

1 Written Opinion - PCT/US2015/015580 — Ipea/Epo - 2016-01-22 (145885W0) — received in.T.1 ; via Fax 14 Jan. 2016.

* cited by examiner

SYSTEM AND METHOD FOR MULTIPLE-FRAME BASED SUPER RESOLUTION INTERPOLATION FOR DIGITAL CAMERAS

BACKGROUND

1. Technical Field

The present invention relates to systems and methods for multiple-frame based super resolution interpolation for digital cameras.

2. Discussion

Digital cameras use various systems to enable photographers to capture images of objects at long distances. Optical zoom systems use one or more zoom lenses that may be adjusted to narrow the field of visible radiation incident on the photo-detectors of the digital camera. The narrower field of visible radiation incident on the photo-detectors magnifies the captured image, albeit with a narrower field of view, without the introduction of significant image aberrations. In contrast, digital zoom systems increase the resolution of images, or a subset of the images, to create an effect similar to optical zoom (i.e., a magnified narrower field of view) through various image processing techniques. Digital zoom systems, however, generally introduce significant undesirable image aberrations relative to optical zoom systems. For example, digital zoom systems may introduce aliasing (i.e., jagged diagonal edges), blurring, and/or haloing into the image.

SUMMARY OF INVENTION

In accordance with at least one aspect of the embodiments disclosed herein, it is recognized that the standard approach to digital zoom systems produces significant image aberrations including, but not limited to, aliasing, blurring, and/or haloing. To minimize the introduction of these image aberrations through digital zoom, systems and methods for multiple-frame based super resolution interpolation for digital cameras are provided. The systems and methods for super resolution digitally zooms input frames (i.e., images in a time sequence) by increasing the resolution of each frame through interpolation and merging the interpolated input frames consistent with a set of weights. For example, the set of weights may include one or more weights for each pixel in each interpolated input frame. In this example, each pixel in the output digitally zoomed image is calculated based on a linear or non-linear combination of pixel values and their associated weights from the interpolated input frames.

According to one aspect, a digital camera system for super resolution image processing constructed to receive a plurality of input frames and output at least one digitally zoomed frame is provided. The digital camera system comprises a motion registration module configured to generate motion information associated with the plurality of input frames, an interpolation module configured to generate a plurality of interpolated input frames based at least in part on the plurality of input frames and the motion information, a weights calculation module configured to calculate one or more weights associated with the plurality of input frames based on at least the motion information, and a weighted merging module configured to merge the plurality interpolated input frames consistent with the one or more weights to generate the at least one digitally zoomed frame.

According to one embodiment, the weighted merging module is further configured to calculate a weighted median of the interpolated input frames based on the one or more weights.

According to one embodiment, the weights calculation module includes a Bayer-pattern sensitive weights calculation module configured to compute at least one of the one or more frame weights based on a Bayer-pattern configuration of a plurality of photoreceptors in an image sensor of the digital camera system. According to one embodiment, the weights calculation module further includes a registration confidence estimation module configured to compute at least one of the one or more weights based on an estimated accuracy level of the motion information. According to one embodiment, the weights calculation module further includes a detail level estimation module configured to compute at least one of the one or more frame weights based on a level of detail in at least one of the plurality of frames.

According to one embodiment, the weights calculation module further includes a registration confidence estimation module configured to compute at least one of the one or more weights based on an estimated accuracy level of the motion information. According to one embodiment, the weights calculation module further includes a detail level estimation module configured to compute at least one of the one or more frame weights based on a level of detail in at least one of the plurality of frames.

According to one embodiment, the plurality of input frames includes at least a current input frame and one of a previous input frame and a previous output frame. According to one embodiment, the weighted merging module is further configured to generate a frame weight map including weight information based on the one or more weights. According to one embodiment, the weights calculation module includes a weight map interpolation module configured to compute at least one of the one or more weights based on the frame weight map of a previous output frame.

According to one embodiment, the plurality of input frames have a first frame rate and the at least one digitally zoomed frame has a second frame rate that is less than the first rate.

According to one aspect, a method of super resolution image processing in a digital camera is provided. The method comprises receiving a plurality of input frames, generating motion information associated with the plurality of input frames, interpolating the plurality of input frames based on the plurality of input frames and the motion information to generate a plurality of interpolated input frames, calculating one or more weights associated with the plurality of input frames based on at least the motion information, and merging the plurality interpolated input frames consistent with the on the one or more weights associated with the plurality of frames to generate at least one digitally zoomed frame.

According to one embodiment, merging the plurality of interpolated input frames includes calculating a weighted median of the interpolated input frames based on the one or more weights.

According to one embodiment, calculating the one or more weights includes calculating at least one of the one or more weights based on a Bayer-pattern configuration of a plurality of photoreceptors in an image sensor of the digital camera system. According to one embodiment, calculating the one or more weights further includes calculating at least one of the one or more weights based on an estimated accuracy level of the motion information. According to one embodiment, calculating the one or more weights further includes calculating at least one of the one or more weights based on a level of detail in at least one of the plurality of input frames.

According to one embodiment, receiving the plurality of input frames includes receiving at least a current input frame and one of a previous input frame and a previous output frame. According to one embodiment, merging the plurality interpolated input frames may include generating a frame weight map including weight information based on the one or more weights. According to another embodiment, calculating the one or more weights may include calculating at least one of the one or more weights based on the frame weight map of a previous frame.

According to one aspect, a non-transitory computer readable medium having stored thereon sequences of instructions for super resolution image processing is provided. The instructions include instructions that instruct at least one processor to receive a plurality of input frames, generate motion information associated with the plurality of input frames, interpolate the plurality of input frames based on the plurality of input frames and the motion information to generate a plurality of interpolated input frames, calculate one or more weights associated with the plurality of input frames based on at least the motion information and a level of detail in at least one of the plurality of frames, and merge the plurality interpolated input frames consistent with the on the one or more weights associated with the plurality of frames to generate at least one digitally zoomed frame.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of the embodiments disclosed herein. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

It is to be appreciated that examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the systems and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Embodiments of the present invention relate to multiple-frame based super resolution interpolation for digital cameras. It should be appreciated that the term "digital camera" used herein includes, but is not limited to, dedicated cameras, video cameras, as well as camera functionality performed by any electronic device (e.g., mobile phones, personal digital assistants, etc.). In addition, the use herein of the term "module" is interchangeable with the term "block" and is meant to include implementations of processes and/or functions in software, hardware, or a combination of software and hardware. In one embodiment, the multiple-frame based super resolution interpolation systems and methods digitally zoom input frames, or any portion of the input frames, without introducing significant aberrations into the output digitally zoomed frames. Digitally zooming images typically introduces significant aberrations including, for example, aliasing, blurring, and/or haloing. Accordingly, in some embodiments, the systems and methods for multiple-frame based super resolution interpolation reduce noise in addition to increasing detail in digitally zoomed frames.

Super Resolution Image Processing System

Figure 1:
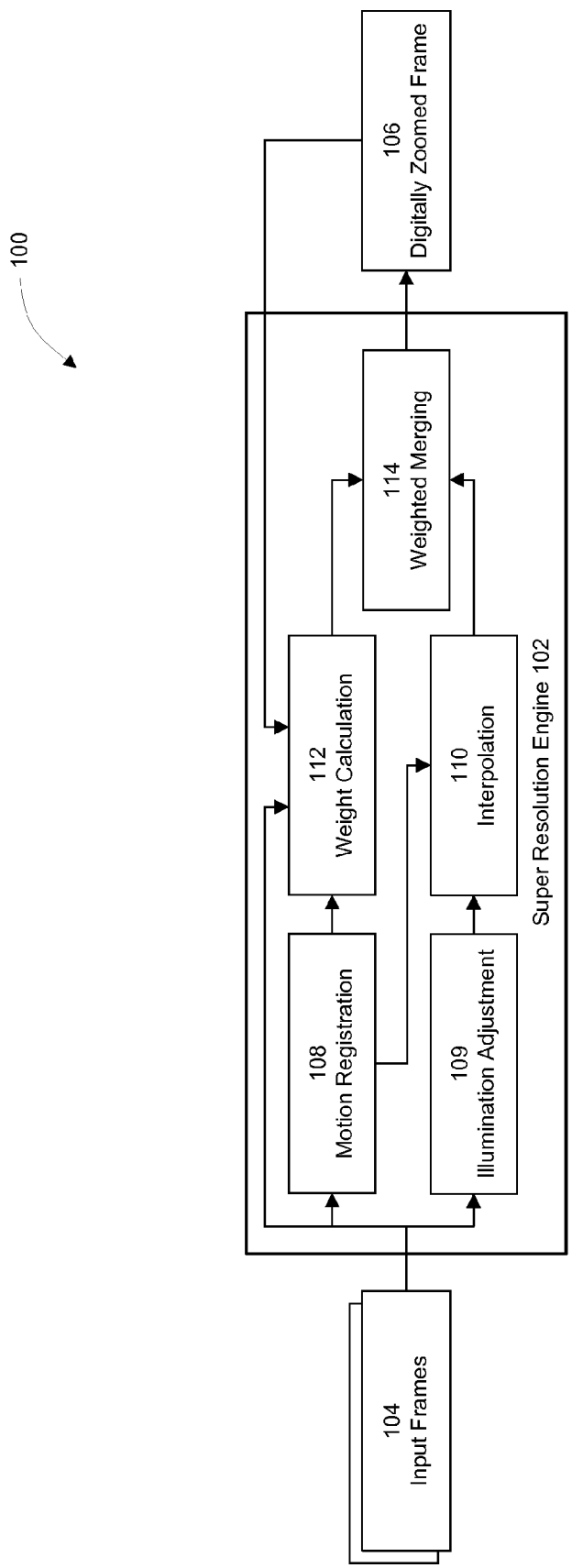
FIG. 1 illustrates a functional block diagram of a super resolution image processing system in accordance with the present invention.

FIG. 1 illustrates an example system for super resolution image processing. As shown, the super resolution image processing system 100 of FIG. 1 includes a super resolution engine 102 that receives input frames 104 and performs image processing on the received input frames 104 to produce at least one digitally zoomed frame 106. The super resolution engine 102 includes multiple functional blocks or modules including a motion registration block 108 to determine motion information associated with the input frames 104, an illumination adjustment block 109 to compensate for illumination changes in the input frames 104, an interpolation block 110 to increase the resolution of the input frames 104, a weight calculation block 112 to determine one or more weights to combine the input frames 104, and a weighted merging block 114 to combine the input frames 104 into the digitally zoomed frame 106 consistent with the one or more weights.

In various embodiments, the input frames 104 include images arranged in, for example, a time sequence or an encoder sequence. Each image comprises a plurality of pixels represented by one or more two dimensional matrices where each element in the matrices represents information regarding a specific pixel location in the image. For example, the location (10, 10) in a first, second, and third two-dimensional matrix may represent data associated with a pixel at the (10, 10) location in the image. Each of the one or more matrices may represent a set of intensities associated with the image in a given dimension. In one embodiment, each pixel in the image is represented by a three-dimensional vector. In this embodiment, the image is represented by a first two dimensional matrix for the first dimension, a second two-dimensional matrix for the second dimension, and a third two-dimensional matrix for the third dimension. It is appreciated that each pixel may be represented by any number of dimensions or any number of matrices.

In some embodiments, the image is represented by three two-dimensional matrices consistent with a YUV color space. The YUV color space is composed of three distinct components Y, U, and V where each two dimensional matrix represents a specific component of the YUV space. The Y component is the luminance component that relates to the brightness of the image. The U and V components are chrominance components that relate to the specific color of the image. Each pixel in an image is represented by a vector in the YUV color space (i.e., some combination of the Y, U, and V components). In some embodiments, the image is represented by three two-dimensional matrices consistent with a RGB color space. The RGB color space is also composed of three distinct components R, G, and B where each two-dimensional matrix represents a specific component of the RGB space. All three of the distinct components (i.e., R, G, and B components) are all chrominance components that relate to the specific color of the image. It is appreciated that the image may be represented in any color space and is not limited to the YUV or RGB color spaces.

The super resolution engine 102 executes a variety of processes to output the at least one digitally zoomed frame 106 based on the input frames 104. The various processes performed by the super resolution engine 102 to generate the digitally zoomed frame 106 include the processes performed by the motion registration block 108, the illumination adjustment block 109, the interpolation block 110, the weight calculation block, and the weighted merging block 114.

In some embodiments, the motion registration module 108 determines motion information associated with the input frames 104. For example, the motion registration module 108 may generate a series of motion vectors representative of the trajectory of pixels in the input frames 104. The motion information generated by the motion registration module 108 may be utilized by the interpolation module 110 in conjunction with the input frames 104 to generate interpolated input frames. The interpolation module 110 increases the resolution of the input frames 104 by one or more interpolation processes including, for example, bicubic interpolation, bilinear interpolation, nearest neighbor interpolation, spline interpolation, or sinc interpolation. The interpolation block 110 may be preceded by an illumination adjustment block 109 to compensate for global and/or local illumination changes between the input frames 104 prior to interpolation. The illumination adjustment block 109 may, for example, compute a difference between low-pass filtered input frames.

The interpolated input frames are merged by the weighted merging module 114 to produce the output digitally zoomed frame 106 consistent with one or more weights generated by the weight calculation block 112. The weight calculation block 112 determines the one or more weights based on various image information including, for example, motion information, Bayer-pattern information, and image detail level information.

In one embodiment, the time intervals between the input frames 104 is smaller than the time intervals between the digitally zoomed output frames 106. For example, a digital camera may capture multiple images in a time sequence of an object and the super resolution engine 102 may output a single still frame. In another example, the super resolution engine 102 may receive input frames 104 at a frame rate in excess of 30 frames per second and output digitally zoomed frames at a frame rate of 30 frames per second.

In various embodiments, the output digitally zoomed frame 106 is processed by one or more single-frame based image processing processes to further improve the quality of the image. Such single-frame based image processing processes are described in co-pending application Ser. No. 13/921,712, titled SYSTEM AND METHOD FOR SINGLE-FRAME BASED SUPER RESOLUTION INTERPOLATION FOR DIGITAL CAMERAS, filed on Jun. 19, 2013 (hereinafter the "'712 application") which is incorporated by reference herein in its entirety. For example, the edge enhancement module disclosed in the '712 application may be employed in a single-frame post processing process to improve the quality of object edges. The edge enhancement module disclosed in the '712 application improves the quality of object edges in an image by extracting the edges of objects in the image, optionally enhancing the extracted edges, and combining the extracted edges with the input image.

It is appreciated that any combination of the super resolution image processing functional blocks (e.g., the motion registration block 108, the illumination adjustment block 109, the interpolation block 110, the weight calculation block 112, and the weighted merging block 114) may perform operations in parallel. In one embodiment, the input frames 104 may be divided into a plurality of subsections. Each subsection of the input frames may be processed individually in parallel. The processed subsections may be combined to form the output digitally zoomed frame 106. Implementing the super resolution image processing in parallel increases the speed in which the digitally zoomed frame 106 can be provided.

It is appreciated that the super resolution engine 102 may take a variety of forms dependent upon the specific application. In some embodiments, the super resolution engine 102 comprises a series of instructions performed by an image processing system. In other embodiments, one or more of the blocks or modules 108, 109, 110, 112, and 114 may be implemented in hardware, such as an application-specific integrated circuit (ASIC), system on a chip (SoC), state machine, or a dedicated processor.

Example Image Processing System

Figure 2:
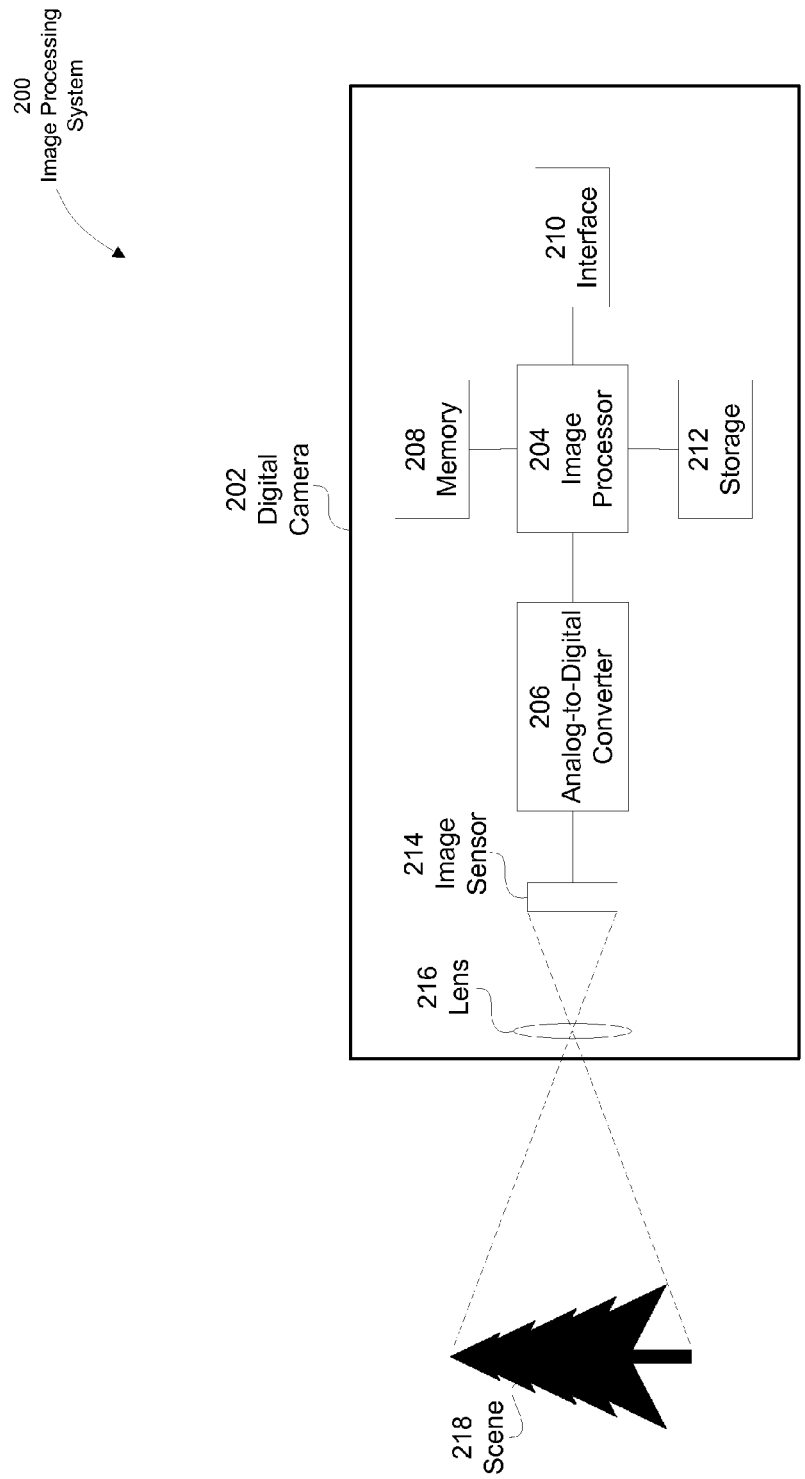
FIG. 2 illustrates an image processing system in which super resolution image processing may be performed.

FIG. 2 illustrates an example image processing system 200 in which super resolution processing can be performed. As shown, the image processing system 200 of FIG. 2 includes a digital camera 202 that is configured to provide digital images and/or video of a scene 218. The digital camera 202 includes an image processor 204, an analog-to-digital converter 206, a memory 208, an interface 210, storage 212, an image sensor 214, and a lens 216.

As illustrated in FIG. 2, the digital camera 202 includes the image processor 204 to implement at least some of the aspects, functions and processes disclosed herein. The image processor 204 performs a series of instructions that result in manipulated data. The image processor 204 may be any type of processor, multiprocessor or controller. Some exemplary processors include processors with ARM11 or ARM9 architectures. The image processor 204 is connected to other system components, including one or more memory devices 208.

The memory 208 stores programs and data during operation of the digital camera 202. Thus, the memory 208 may be a relatively high performance, volatile, random access memory such as a dynamic random access memory ("DRAM") or static memory ("SRAM"). However, the memory 208 may include any device for storing data, such as a flash memory or other non-volatile storage devices. Various examples may organize the memory 208 into particularized and, in some cases, unique structures to perform the functions disclosed herein. These data structures may be sized and organized to store values for particular data and types of data.

The data storage element 212 includes a writeable nonvolatile, or non-transitory, data storage medium in which instructions are stored that define a program or other object that is executed by the image processor 204. The data storage element 212 also may include information that is recorded, on or in, the medium, and that is processed by the image processor 204 during execution of the program. More specifically, the information may be stored in one or more data structures specifically configured to conserve storage space or increase data exchange performance. The instructions may be persistently stored as encoded signals, and the instructions may cause the image processor 204 to perform any of the functions described herein. The medium may, for example, be optical disk, magnetic disk or flash memory, among others. In operation, the image processor 204 or some other controller causes data to be read from the nonvolatile recording medium into another memory, such as the memory 208, that allows for faster access to the information by the image processor 204 than does the storage medium included in the data storage element 212. The memory may be located in the data storage element 212 or in the memory 208, however, the image processor 204 manipulates the data within the memory, and then copies the data to the storage medium associated with the data storage element 212 after processing is completed. A variety of components may manage data movement between the storage medium and other memory elements and examples are not limited to particular data management components. Further, examples are not limited to a particular memory system or data storage system.

The digital camera 202 also includes one or more interface devices 210 such as input devices, output devices and combination input/output devices. Interface devices may receive input or provide output. More particularly, output devices may render information for external presentation. Input devices may accept information from external sources. Examples of interface devices include microphones, touch screens, display screens, speakers, buttons, printers, etc. Interface devices allow the digital camera 202 to exchange information and to communicate with external entities, such as users and other systems.

Although the digital camera 202 is shown by way of example as one type of digital camera upon which various aspects and functions may be practiced, aspects and functions are not limited to being implemented on the digital camera 202 as shown in FIG. 2. Various aspects and functions may be practiced on digital cameras having a different architectures or components than that shown in FIG. 2. For instance, the digital camera 202 may include specially programmed, special-purpose hardware, such as an application-specific integrated circuit ("ASIC") or a system on a chip ("SoC") tailored to perform a particular operation disclosed herein. It is appreciated that the digital camera 202 may be incorporated into another electronic device (e.g., mobile phone, personal digital assistant etc.) and is not limited to dedicated digital cameras or video cameras.

The lens 216 includes one or more lenses that focus the visible radiation on the image sensor 214. It is appreciated that the lens 216 is not limited to a single physical lens as illustrated in FIG. 2. In some embodiments, the lens 216 includes a plurality of zoom lenses that enable optical zoom. Optical zoom may be accomplished by narrowing the field of view of the visible radiation incident on the image sensor 214.

The image sensor 214 may include a two-dimensional area of sensors (e.g., photo-detectors) that are sensitive to light. In some embodiments, the photo-detectors of the image sensor 214, in some embodiments, can detect the intensity of the visible radiation in one of two or more individual color and/or brightness components. For example, the output of the photo-detectors may include values consistent with a YUV or RGB color space. It is appreciated that other color spaces may be employed by the image sensor 214 to represent the captured image and the photo-detectors may be arranged consistent with one or more patterns. For example, the photo-detectors may be arranged consistent with a Bayer pattern. In this example, the photo-detector grid is constructed to detect green light at 50% of the photo-detectors, red light at 25% of the photo-detectors, and blue light at 25% of the photo-detectors.

In various embodiments, the image sensor 214 outputs an analog signal proportional to the intensity and/or color of visible radiation striking the photo-detectors of the image sensor 214. The analog signal output by the image sensor 214 may be converted to digital data by the analog-to-digital converter 206 for processing by the image processor 204. In some embodiments, the functionality of the analog-to-digital converter 206 is integrated with the image sensor 214. The image processor 204 may perform a variety of processes to the captured images and/or video. These processes may include, but are not limited to, one or more super resolution processes to digitally zoom the captured images.

Super Resolution Image Processing Implementations

Figure 3:
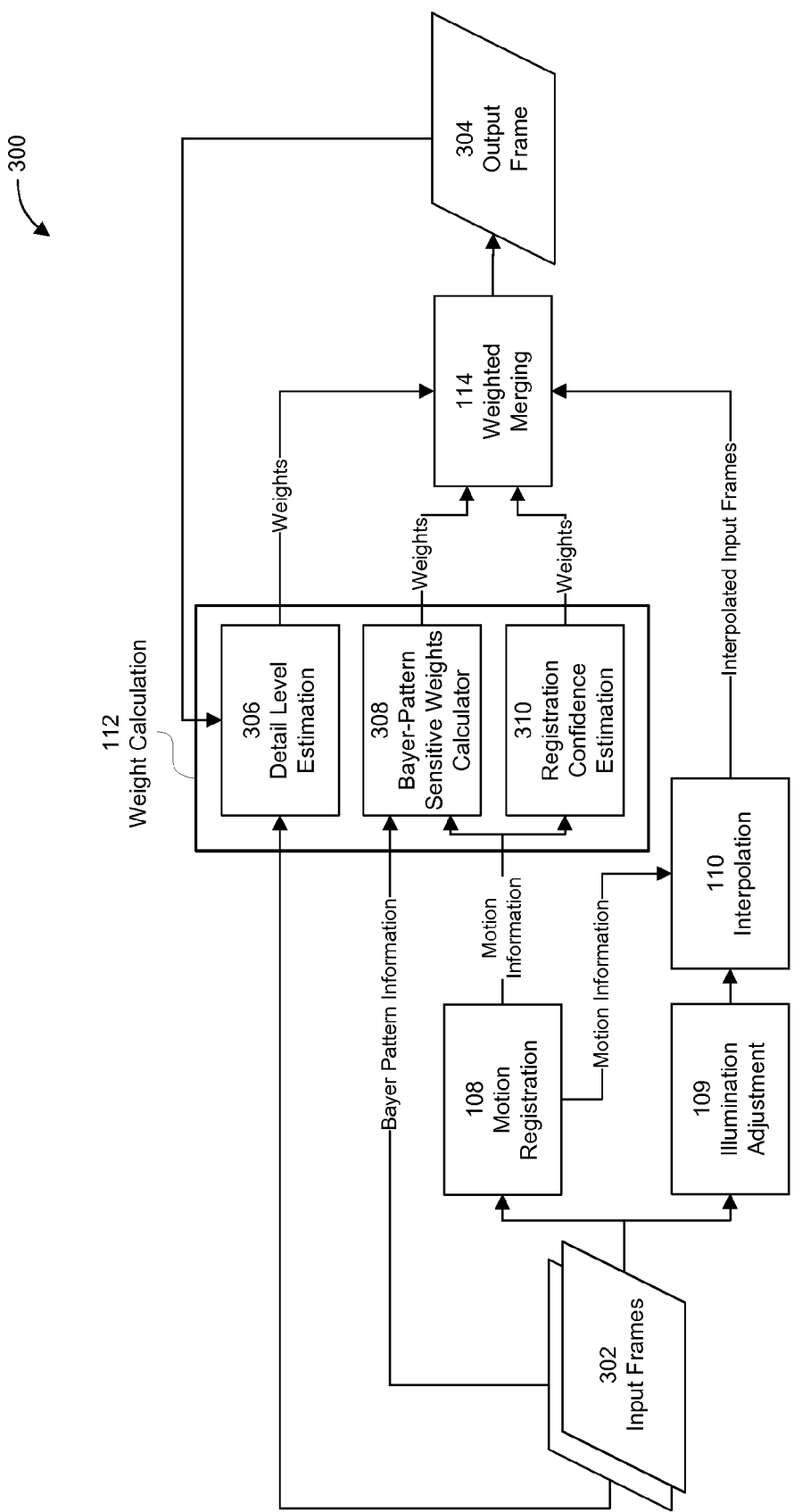
FIG. 3 illustrates a more detailed functional block diagram of a super resolution image processing system for super resolution image processing in accordance with an embodiment of the present invention.

FIG. 3 illustrates a more detailed functional block diagram of the super resolution image processing system 100 depicted in FIG. 1. As shown in FIG. 3, the super resolution image processing system 300 of FIG. 3 receives input frames 302 and processes the received input frames 302 though a motion registration block 108, an illumination adjustment block 109, an interpolation block 110, a weight calculation block 112, and a weighted merging block 114 to produce at least one digitally zoomed output frame 304. In accordance with one embodiment of the super resolution imaging processing system, the weight calculation block 112 in the super resolution image processing system 300 includes a detail level estimation block 306, a Bayer-Pattern sensitive weights calculator block 308, and a registration confidence estimation block 310.

The motion registration block 108 generates motion information based on the received input frames 302. The motion information includes, for example, one or more matrices of motion vectors where each motion vector represents the trajectory of a given pixel through the received input frames 302. The motion information may be generated consistent with a motion model including, for example, an affine model and include local motion correction and/or motion constraints. It is appreciated that the set of motion vectors are not limited to being associated with pixels in an image. For example, motion vectors may be associated with sections or sub-pixels of the input frames 302.

The interpolation block 110 increases the resolution of the received input frames 302 through an interpolation process to generate interpolated input frames. Example interpolation processes include bicubic interpolation, bilinear interpolation, nearest neighbor interpolation, spline interpolation, and sinc interpolation. It is appreciated that the interpolation block 110 may use motion information in the interpolated process to improve the quality of the interpolated input frames. The interpolation block 110 may be preceded by an illumination adjustment block 109 to compensate for local and/or global illumination changes between frames prior to interpolation.

The weight calculation block 112 determines one or more weights associated with the input frames 302 that are employed by the weighted merging block 114 to combine the interpolated input frames. The detail level estimation block 308, the Bayer-Pattern sensitive weights calculator block 310, and the registration confidence block 312 are one illustration of the weight calculator block 112.

The detail level estimation block 306 calculates one or more weights based on an identified amount of detail in the input frames 302 and/or the output frame 304. The detail level estimation block 306 reduces the weight of frames, or sections of frames, in the output frame 304 that have motion-blur or focus changes that cause detail blurring. It is appreciated that the detail level estimation block 306 may identify the level of detail on a per-frame basis or a per-pixel basis.

The Bayer-pattern sensitive weights calculator 310 calculates one or more weights based on the Bayer-pattern information from the input frames 302 and motion information from the motion registration block 108. As discussed above with reference to the image sensor 214 of image processing system 200, an image sensor is comprised of a two-dimensional array of photo-detectors. The photo-detector grid may be arranged consistent with a Bayer-pattern and thereby detect green light at 50% of the photo-detectors, red light at 25% of the photo-detectors, and blue light at 25% of the photo-detectors. The Bayer-pattern sensitive weights calculator 310 takes into account the Bayer-pattern of the input frames 302 in addition to the motion information to give more weight to regions or pixels in the interpolated frame that are closer to their originated sensor location (i.e., the sensor producing the pixel data). Conversely, the Bayer-pattern sensitive weights calculator 310 will give less weight to regions or pixels in the interpolated frame that are further away from their originated sensor location.

The registration confidence estimation block 312 calculates one or more weights based on the quality of the motion information. The registration confidence estimation block 312 identifies areas in the frame where the generated motion vector did not register well between the input frames 302. The areas that registered poorly may include, for example, occluded and revealed regions in addition to regions whose motion is inconsistent with an assumed motion model, if any motion model is assumed. The registration confidence estimation block 312 reduces the weight of frames, regions of frames, or pixels where the generated motion information quality is poor.

The weighted merging block 114 generates the output digitally zoomed frame 304 by merging the interpolated input images consistent with the one or more weights calculated by the weight calculation block 112. The weighted merging block 114 may employ a function to merge the interpolated frames including, for example, a weighted median of the interpolated frames.

Having described at least one implementation of the super resolution image processing system, it is appreciated that the specific implementations described may be altered to generate the same result of digitally zooming an image without introducing significant image aberrations. Another example implementation of the super resolution image processing system is illustrated by functional block diagram of super resolution image processing system 400 with reference to FIG. 4.

Figure 4:
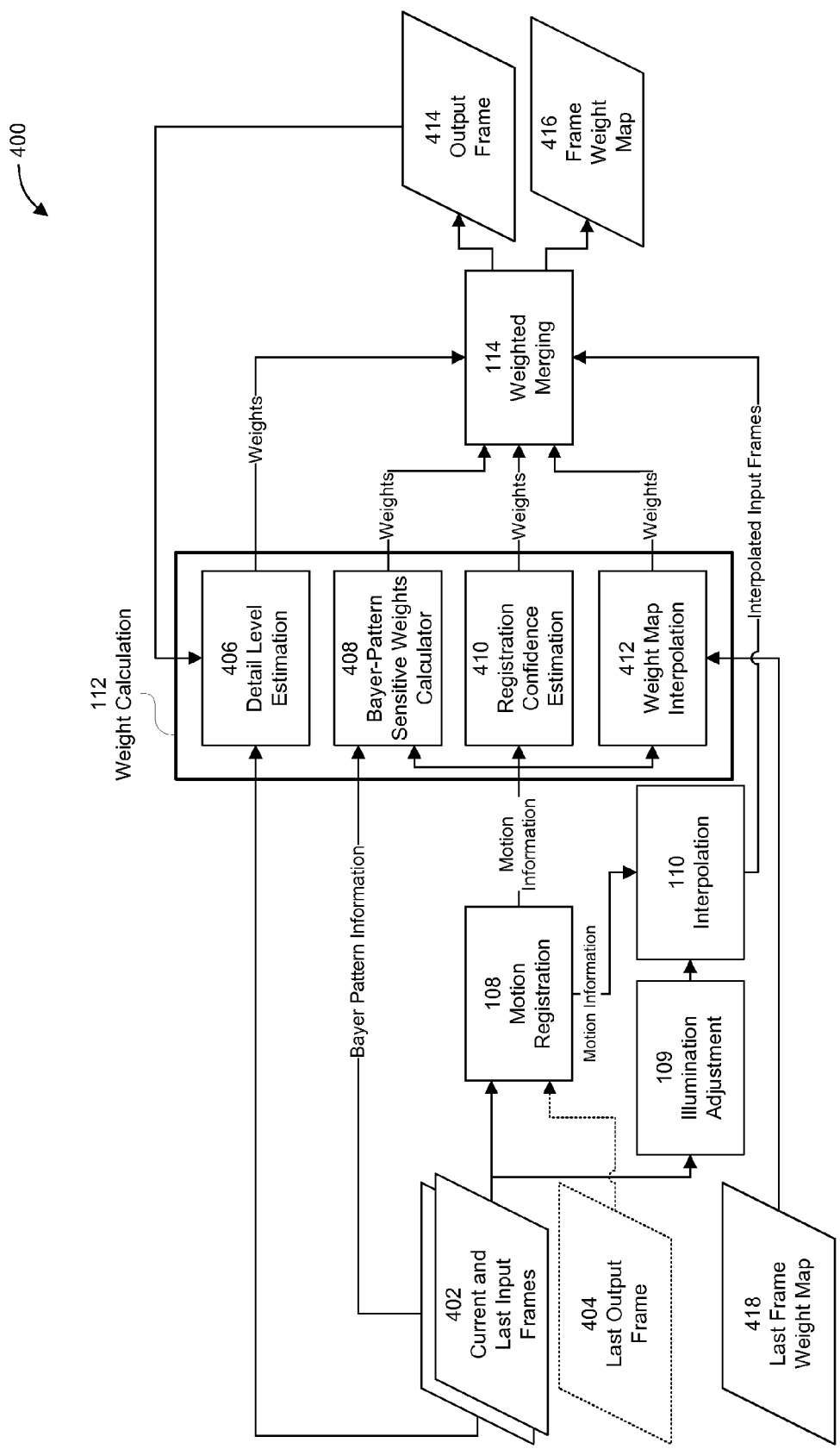
FIG. 4 illustrates a more detailed functional block diagram of a super resolution image processing system for super resolution image processing in accordance with another embodiment of the present invention.

FIG. 4 illustrates an alternative detailed functional block diagram of the super resolution image processing system 100 depicted in FIG. 1. As shown in FIG. 4, the super resolution image processing system 400 of FIG. 4 receives a current input frame and a previous input frame 402, a last output frame 404, and a last frame weight map 418 and generates an output frame 414 in addition to a frame weight map 416. The super resolution image processing system 400 processes the received image information through a motion registration block 108, an illumination adjustment block 109, an interpolation block 110, a weight calculation block 112, and a weighted merging block 114. In accordance with one embodiment of the super resolution image processing system, the weight calculation block 112 in the super resolution image processing system 400 includes a detail level estimation block 406, a Bayer-Pattern sensitive weights calculator block 408, a registration confidence estimation block 410, and a weight map interpolation block 412.

In one embodiment, the super resolution image processing system 400 reduces the required processing power by only merging two frames for each output frame. The super resolution image processing system 400 interpolates the current and last input frames 402 in the interpolation block 110. The interpolated frames are merged in the weighted merging block 114 as described above with reference to FIGS. 1 and 3. The implementation in FIG. 4 reduces the requirements for processing power as well as reducing memory size and bandwidth requirements from the system. The weighted merging block 114 further outputs a frame weight map 416. The frame weight map 416 may include, for example, one or more matrices representative of the one or more weights or a combined metric calculated by the weight calculation block 112. The frame weight map of the previous frame 418 is then employed by the weight map interpolation block 412 within the weight calculation block 112 to generate one or more weights for the current frame.

In some embodiments, the motion registration block 108 generates motion information based on the current input frame and one of the last input frame and the last output frame 404. The motion information (e.g., motion error information or similar) is employed by the weight calculation block 112 as described above with reference to FIG. 3. It is appreciated that the detail level estimation block 406, the Bayer-Pattern sensitive weights calculator block 408, and the registration confidence estimation block 410 may, or may not, be constructed to be identical to the detail level estimation block 306, the Bayer-Pattern sensitive weights calculator block 308, and the registration confidence estimation block 310, respectively, as described above with reference to FIG. 3.

Having thus described several aspects of at least one example, it is to be appreciated various alterations, modification, and improvements will readily occur to those skilled in the art. Such alterations, modifications, and improvements are intended to be part of this disclosure, and are intended to be within the scope of the embodiments disclosed herein. Accordingly, the foregoing description and drawings are by way of example only.

What is claimed is:

1. A digital camera system for super resolution image processing constructed to receive a plurality of input frames and output at least one digitally zoomed frame, the digital camera system comprising at least one processor configured to:
   generate motion information associated with the plurality of input frames;
   generate a plurality of interpolated input frames based at least in part on the plurality of input frames and the motion information;
   calculate one or more weights associated with the plurality of input frames based on at least the motion information; and
   merge the plurality of interpolated input frames consistent with the one or more weights to generate the at least one digitally zoomed frame and generate a frame weight map for the digitally zoomed frame, the frame weight map including weight information based on the one or more weights.

2. The digital camera system of claim 1, wherein the at least one processor is further configured to calculate a weighted median of the interpolated input frames based on the one or more weights.

3. The digital camera system of claim 1, wherein the at least one processor is further configured to compute at least one of the one or more frame weights based on a Bayer-pattern configuration of a plurality of photoreceptors in an image sensor of the digital camera system.

4. The digital camera system of claim 3, wherein the at least one processor is further configured to compute at least one of the one or more weights based on an estimated accuracy level of the motion information.

5. The digital camera system of claim 4, wherein the at least one processor is further configured to compute at least one of the one or more frame weights based on a level of detail in at least one of the plurality of frames.

6. The digital camera system of claim 1, wherein the at least one processor is further configured to compute at least one of the one or more weights based on an estimated accuracy level of the motion information.

7. The digital camera system of claim 6, wherein the at least one processor is further configured to compute at least one of the one or more frame weights based on a level of detail in at least one of the plurality of frames.

8. The digital camera system of claim 1, wherein the plurality of input frames includes at least a current input frame and one of a previous input frame and a previous output frame.

9. The digital camera system of claim 1, wherein the at least one processor is further configured to compute at least one of the one or more weights based on the frame weight map of a previous output frame.

10. The digital camera system of claim 1, wherein the plurality of input frames have a first frame rate and the at least one digitally zoomed frame has a second frame rate that is less than the first rate.

11. A method of super resolution image processing in a digital camera, the method comprising:
   receiving a plurality of input frames;
   generating motion information associated with the plurality of input frames;
   interpolating the plurality of input frames based on the plurality of input frames and
   the motion information to generate a plurality of interpolated input frames;
   calculating one or more weights associated with the plurality of input frames based on at least the motion information; and
   merging the plurality of interpolated input frames consistent with the one or more weights associated with the plurality of frames to generate at least one digitally zoomed frame and generating a frame weight map for the digitally zoomed frame, the frame weight map including weight information based on the one or more weights.

12. The method of claim 11, wherein merging the plurality of interpolated input frames includes calculating a weighted median of the interpolated input frames based on the one or more weights.

13. The method of claim 11, wherein calculating the one or more weights includes calculating at least one of the one or more weights based on a Bayer-pattern configuration of a plurality of photoreceptors in an image sensor of the digital camera.

14. The method of claim 13, wherein calculating the one or more weights further includes calculating at least one of the one or more weights based on an estimated accuracy level of the motion information.

15. The method of claim 14, wherein calculating the one or more weights further includes calculating at least one of the one or more weights based on a level of detail in at least one of the plurality of input frames.

16. The method of claim 11, wherein receiving the plurality of input frames includes receiving at least a current input frame and one of a previous input frame and a previous output frame.

17. The method of claim 11, wherein calculating the one or more weights includes calculating at least one of the one or more weights based on the frame weight map of a previous frame.

18. A non-transitory computer readable medium having stored thereon sequences of instructions for super resolution image processing that instruct at least one processor to:
   receive a plurality of input frames;
   generate motion information associated with the plurality of input frames;
   interpolate the plurality of input frames based on the plurality of input frames and the motion information to generate a plurality of interpolated input frames;
   calculate one or more weights associated with the plurality of input frames based on at least the motion information and a level of detail in at least one of the plurality of frames; and
   merge the plurality of interpolated input frames consistent with the one or more weights associated with the plurality of frames to generate at least one digitally zoomed frame and generate a frame weight map for the digitally zoomed frame, the frame weight map including weight information based on the one or more weights.

* * * * *